US010198207B2

(12) United States Patent
Lee et al.

(10) Patent No.: US 10,198,207 B2
(45) Date of Patent: Feb. 5, 2019

(54) MEMORY SYSTEM AND METHOD FOR MAPPING NONVOLATILE MEMORIES

(71) Applicant: SK hynix Inc., Gyeonggi-do (KR)

(72) Inventors: Jong-Min Lee, Seoul (KR); Jee-Yul Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/448,781

(22) Filed: Mar. 3, 2017

(65) Prior Publication Data

US 2018/0024745 A1    Jan. 25, 2018

(30) Foreign Application Priority Data

Jul. 21, 2016   (KR) .................. 10-2016-0092414

(51) Int. Cl.
*G06F 12/02* (2006.01)
*G06F 3/06* (2006.01)
*G06F 12/00* (2006.01)
*G06F 11/10* (2006.01)

(52) U.S. Cl.
CPC .............. *G06F 3/064* (2013.01); *G06F 3/061* (2013.01); *G06F 3/0679* (2013.01); *G06F 11/1004* (2013.01); *G06F 12/00* (2013.01); *G06F 12/0246* (2013.01); *G06F 12/0292* (2013.01); *G06F 2212/1016* (2013.01); *G06F 2212/7201* (2013.01); *G06F 2212/7208* (2013.01)

(58) Field of Classification Search
CPC ... G06F 12/02; G06F 12/0292; G06F 12/0246
USPC ........................................................ 711/202
See application file for complete search history.

(56) References Cited

U.S. PATENT DOCUMENTS

| 6,377,500 | B1 * | 4/2002 | Fujimoto | G06F 12/0246 365/230.01 |
| 7,870,351 | B2 | 1/2011 | Resnick | |
| 8,069,297 | B2 | 11/2011 | Nishihara | |
| 8,954,644 | B2 | 2/2015 | Lee | |
| 2013/0304975 | A1 * | 11/2013 | Wang | G06F 12/0246 711/103 |
| 2014/0115238 | A1 * | 4/2014 | Xi | G06F 12/12 711/103 |
| 2015/0347316 | A1 | 12/2015 | Carofiglio et al. | |

* cited by examiner

*Primary Examiner* — Than Nguyen
(74) *Attorney, Agent, or Firm* — IP & T Group LLP

(57) ABSTRACT

A memory system includes: a memory device including a plurality of pages which include a plurality of memory cells coupled to a plurality of word lines and in which data are stored, and a plurality of memory blocks in which the pages are included; and a controller including a memory, and suitable for storing data segments of user data corresponding to a write command received from a host, in pages included in a first memory block and a second memory block among the memory blocks and generating map data corresponding to storage of the data segments by sorting map segments of the map data according to logical informations of the data segments.

14 Claims, 12 Drawing Sheets

MEMORY SYSTEM AND METHOD FOR MAPPING NONVOLATILE MEMORIES

CROSS-REFERENCE TO RELATED APPLICATION

This application claims priority under 35 U.S.C. § 119(a) to Korean Patent Application No. 10-2016-0092414 filed on Jul. 21, 2016 in the Korean Intellectual Property Office, the disclosure of which is incorporated herein by reference in its entirety.

TECHNICAL FIELD

Exemplary embodiments relate generally to a memory system for processing data to and from a memory device, and an operating method thereof.

DISCUSSION OF THE RELATED ART

The computer environment paradigm has changed to ubiquitous computing systems that can be used anytime and anywhere. Due to this fact use of portable electronic devices such as mobile phones, digital cameras, and notebook computers has rapidly increased. These portable electronic devices generally use a memory system having one or more memory devices for storing data. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB)) memory devices, memory cards having various interfaces, and solid state drives (SSD).

SUMMARY

Various embodiments are directed to an improved memory system for processing data to and from a memory device included in the memory system and an operating method thereof. The memory system and operating method thereof provide a faster, more efficient mapping operation. The memory system is capable of optimizing the overall use efficiency of a memory device, thereby more quickly and stably processing data to and from the memory device.

In an embodiment, a memory system may include: a memory device including a plurality of memory blocks, each memory block including a plurality of pages each page including a plurality of memory cells for storing data; and a controller suitable for storing data segments of user data corresponding to a write command, in a plurality of pages included in a first memory block and a second memory block among the plurality of memory blocks and generating map data corresponding to the stored data segments by sorting map segments of the map data according to logical information of the data segments.

The controller may divide the map segments sorted according to the logical information, by the first memory block and the second memory block in which the data segments are stored.

The controller may generate first, map data including first map segments corresponding to the first memory block among the map segments, and second map data including second map segments corresponding to the second memory block among the map segments.

The controller may store the first map data in the pages included in the first memory block, and stores the second map data in the pages included in the second memory block.

The controller may store the first map data and the second map data in pages included in a third memory block among the plurality of memory blocks.

The controller may generate first map data of the first memory block by sorting first map segments corresponding to the first memory block among the map segments, according to the logical information. The controller may generates second map data of the second memory block by sorting second map segments corresponding to the second memory block among the map segments, according to the logical information.

The controller may further include a memory. The controller may store the first map data and the second map data in the pages included in the plurality of memory blocks. In the case of updating the first map data and the second map data in correspondence to storage of the data segments, the controller may load the first map data and the second map data in the memory.

The controller may update the first map data and the second map data by merging map segments of the first map data and the second map data generated in correspondence to storage of the data segments and map segments of first map data and the second map data loaded in the memory.

The controller may update the first map data and the second map data by merging the map segments of the first map data and the second map data in a state In which they are sorted according to the logical information.

The controller may sort indexes indicating storage in the pages of the first memory block and the second memory block in the sequence of logical page numbers (LPNs) of the data segments, in a map table of the map data.

In an embodiment, A method for operating a memory system, may include: receiving a write to command, for a memory device including a plurality of memory blocks, each including a plurality of pages; storing data segments of user data corresponding to the write command, in pages included in a first memory block and a second memory block among the plurality of memory blocks; and generating map data corresponding to storage of the data segments by sorting map segments of the map data according to logical information of the data segments.

The method may further include: dividing the map segments sorted according to the logical information, by the first memory block and the second memory block in which the data segments are stored.

The generating of the map data may include: generating first map data including first map segments corresponding to the first memory block among the map segments; and generating second map data including second map segments corresponding to the second memory block among the map segments.

The method may further include: storing the first map data in the pages included in the first memory block, and storing the second map data in the pages included in the second memory block.

The method may further include: storing the first map data and the second map data in pages included in a third memory block among the plurality of memory blocks.

The generating of the map data may include: generating first map data of the first memory block by sorting first map segments corresponding to the first memory block among the map segments, according to the logical information; and generating second map data of the second memory block by sorting second map segments corresponding to the second memory block among the map segments, according to the logical information.

The method may further include: storing the first map data and the second map data in the pages included in the plurality of memory blocks, and loading, in the case of updating the first map data and the second map data in correspondence to storage of the data segments, the first map data and the second map data in a memory included in a controller.

The method may further include: updating the first map data and the second map data by merging map segments of the first map data and the second map data generated in correspondence to storage of the data segments and map segments of first map data and the second map data loaded in the memory.

The updating of the first map data and the second map data may include updating the first map data and the second map data by merging the map segments of the first map data and the second map data in a state in which they are sorted according to the logical information.

The generating of the map data may include: sorting indexes indicating storage in the pages of the first memory block and the second memory block in the sequence of logical page numbers (LPNs) of the data segments, in a map table of the map data.

BRIEF DESCRIPTION OF THE DRAWINGS

These and other features and advantages of the present invention of the present invention will be described in reference to the accompanying drawings, wherein.

DETAILED DESCRIPTION

Figure 1:
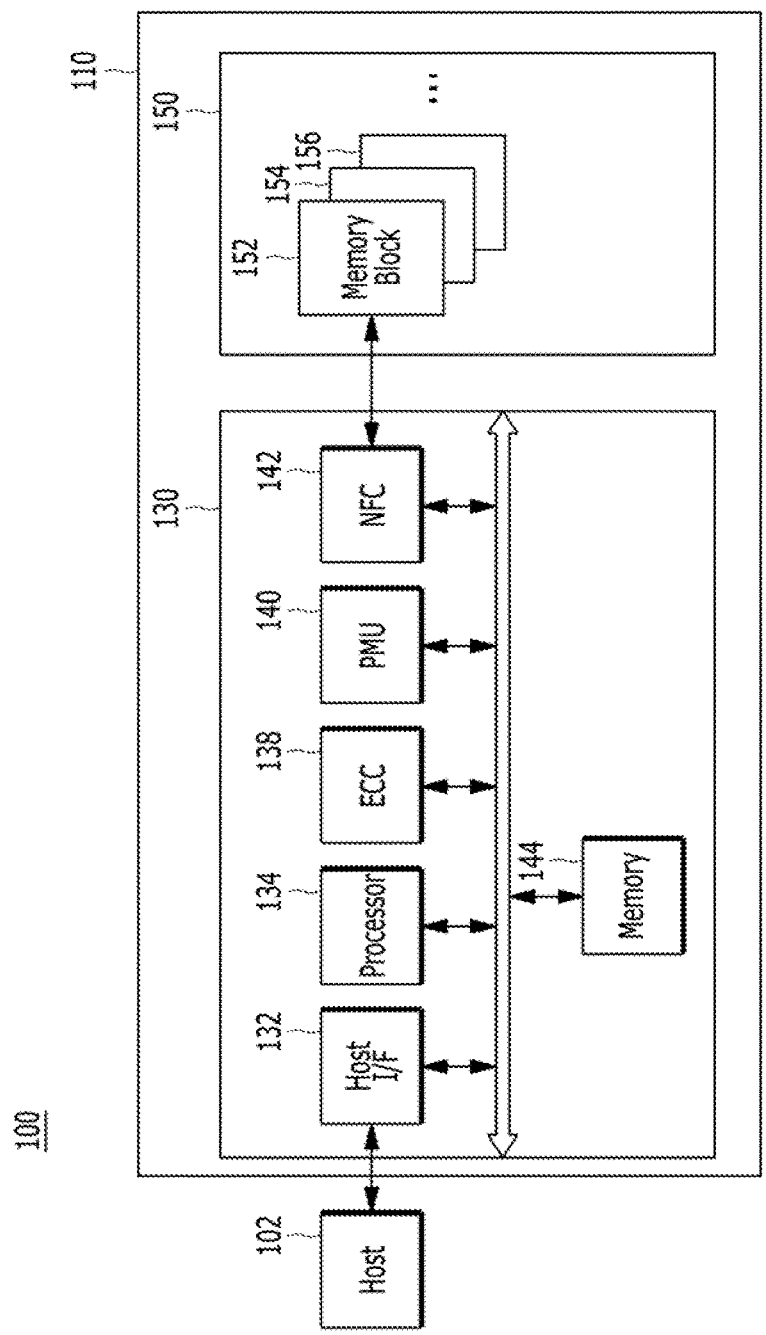
FIG. 1 is a diagram illustrating a data processing system including a memory system, according to an embodiment of the present invention.

Various embodiments of the present invention are described below in more detail with reference to the accompanying drawings. We note, however, that the present invention may be embodied in many different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions thereof may have been exaggerated in order to clearly illustrate various features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth for providing a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an embodiment of the present invention.

Referring to FIG. 1, the data processing system 100 may also include a host 102 that is operatively coupled to the memory system 110.

The host 102 may be an electronic apparatus and may include, for example, a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as a dynamic random access memory (DRAM) and a static random access memory (SRAM) or a nonvolatile memory device, such as a read only memory (ROM), a mask ROM (MROM), a programmable ROM (PROM), an erasable programmable ROM (EPROM), an electrically erasable programmable ROM (EEPROM) a ferroelectric random access memory (FRAM), a phase-change RAM (PRAM), a magnetoresistive RAM (MRAM), a resistive RAM (RRAM) and a flash memory, The memory system 110 may include a memory device 150 and a controller 130. The memory device 150 stores data to be accessed by the host 102, and the controller 130 controls data exchange between the memory device 150 and the host 102. That is, under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as at least one part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power to the device is blocked. The memory device 150 may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells. The memory cells of a page may be electrically coupled to the same word line (WL). The memory cells may be single bit cells or multi-bit cells. The memory cells may be arranged in a two-dimensional (2D) or a three-dimensional (3D) stacked structure. The memory device 150 may be a nonvolatile memory device, such as a flash memory. The flash memory may have a 3D stack structure. The structure of the memory device 150 and the 3D stack structure of the memory device 150 will be described later in detail with reference to FIGS. 2 to 4. The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control the overall operations of the memory device 150 including operations such as read, write, program, and erase operations. The controller 130 may be configured to store data segments of user data corresponding to a write command, in a plurality of pages included in at least a first and a second memory block among the plurality of memory blocks of the memory device and to generate map data corresponding to the stored data segments by sorting map segments of the map data according to logical information of the data segments. The controller 130 may also organize (or divide) the map segments which are sorted according to the logical information by taking into account the memory block in which the data segments are stored. For example, the controller 130 may generate first map data including first map segments corresponding to the first memory block, and second map data including second map segments corresponding to the second memory block among the map segments. The controller 130 may store the first map data in pages included in the first memory block, and stores the second map data in pages included in the second memory block. In another embodiment, the controller 130 may store the first map data and the second map data in pages included in a third memory block among the plurality of memory blocks. The controller 130 may generate the first map data of the first memory block by sorting first map segments corresponding to the first memory block among the map segments, according to the logical information and the second map data of the second memory block by sorting second map segments corresponding to the second memory block among the map segments, according to the logical information.

The controller 130 may comprise a memory 144 wherein the controller stores the first map data and the second map data before storing them in the pages included in the plurality of memory blocks. When updating the first map data and the second map data in correspondence to storage of the data segments, the controller 130 may load the first map data and the second map data in the memory 144. The controller 130 may update the first map data and the second map data by merging map segments of the first map data and the second map data generated in correspondence to storage of the data segments and map segments of the first map data and the second map data loaded in the memory 144. For example the controller 130 may update the first map data and the second map data by merging the map segments of the first map data and the second map data in a state in which they are sorted according to the logical information. The controller 130 may sort indexes which indicate the storing of the data segments in the pages of the first memory block and the second memory block in the sequence of logical page numbers (LPNs) of the data segments, in a map table of the map data.

The controller 130 may also include a host interface (I/F) unit 132, a processor 134, an error correction code (ECC) unit 138 a power management unit (PMU) 140, and a NAND flash controller (NEC) 142.

The host interface unit 132 may process commands and data provided from the host 102, and may communicate with the host 102 through at least one of various interface protocols such as universal serial bus (USB), multimedia card (MMC), peripheral component interconnect express (PCI-e), serial attached SCSI (SAS), serial advanced technology attachment (SAA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150 such as read, write, program and erase operations, the memory 144 may store data used by the controller 130 and the memory device 150.

The memory 144 may be implemented with volatile memory such as a static random access memory (SRAM) or a dynamic random access memory (DRAM). As described above, the memory 144 may store data used by the host 102 and the memory device 150 for the read and write operations. For the storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorate the utilization efficiency of the memory device 150 having a 3D stack structure and the reliability of the memory system 100, and thus reliable bad block management is required.

Figure 2:
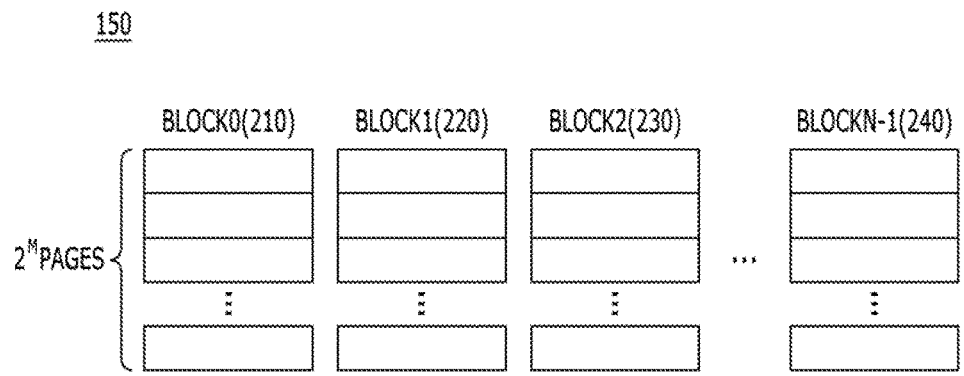
FIG. 2 is a diagram illustrating a memory device employed in the memory system of FIG. 1.

FIG. 2 is a diagram illustrating the memory device 150 shown in FIG. 1.

Referring to FIG. 2, the memory device 150 may include a plurality of memory blocks. For example, the memory device 150 may include a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, 2$^M$ number of pages (2$^M$ PAGES). Each of the pages may include a plurality of memory cells. The memory cells of each page may be electrically coupled to a word line.

Also, the memory device 150 may include a plurality of memory blocks as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
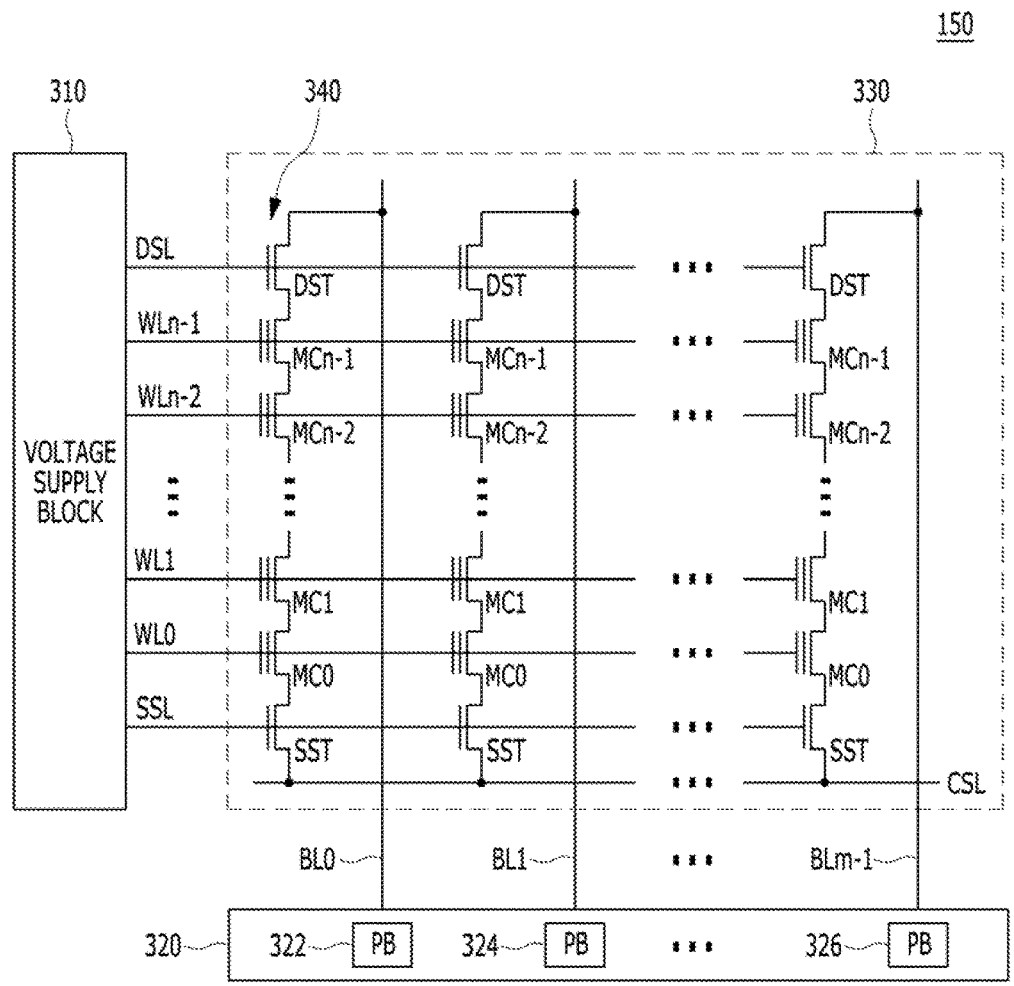
FIG. 3 is a diagram illustrating a memory block in a memory device, according to an embodiment of the present invention.

FIG. 3 is a diagram illustrating a memory device 150 including the memory block shown in FIG. 2. For example, FIG. 3 shows a detailed configuration that the memory device 150 may include a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor DST and at least one source select transistor SST. A plurality of memory cell transistors MC0 to MCn-1 may be electrically coupled in series between the select transistors SST and DST. The respective memory cells MC0 to MCn-1 may be configured by multi-level cells (MLC), each of which stores data information of a plurality of bits. The cell strings 340 may be electrically coupled to the corresponding bit lines BL0 to BLm-1, respectively. For reference, in FIG. 3, 'DSL' denotes a drain select line (i.e., a string select line), 'SSL' denotes a source select line (i.e., a ground select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as, a 2D or 3D memory device. For example, as shown in FIG. 4, in the case where the memory device 150 is realized as a 3D nonvolatile memory device, the memory device 150 may include a plurality of memory blocks BLK0 to BLKN-1.

Figure 4:
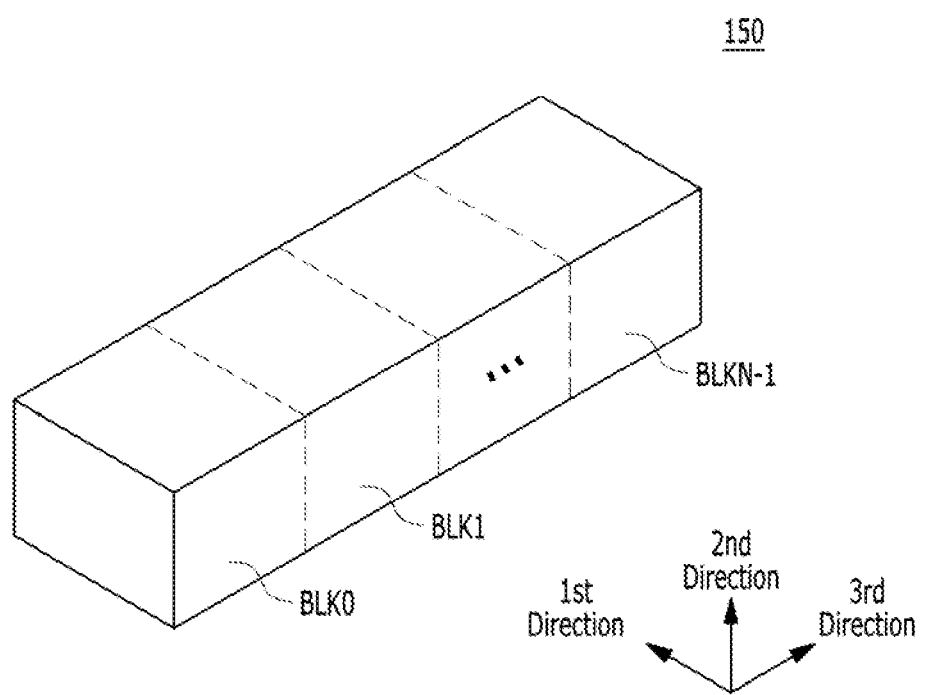
FIG. 4 is a diagram illustrating a configuration of a memory device, according to an embodiment of the present invention.

FIG. 4 is a diagram illustrating the memory blocks of the memory device 150 shown in FIG. 3, and the memory blocks BLK0 to BLKN-1 may be realized as a 3D structure (or a vertical structure). For example, the respective memory blocks BLK0 to BLKN-1 may be realized as a 3D structure by including a structure which extends in first to third directions (for example, the x-axis direction, the y-axis direction and the z-axis direction).

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one source select line, a plurality of word lines, at least one dummy word line, and a common source line. Namely, the respective memory blocks BLK0 to BLKN-1 may be electrically coupled to a plurality of bit lines, a plurality of drain select lines, a plurality of source select lines, a plurality of word lines, a plurality of dummy word lines, and a plurality of common source lines.

Hereinbelow, detailed descriptions will be made with reference to FIGS. 5 to 10, for data processing with respect to a memory device 150 in memory system in accordance with an embodiment, particularly, a command operation corresponding to a command received from a host 102, for example, a command data processing operation with respect to the memory device 150.

FIGS. 5 to 9 are diagrams illustrating a data processing operation with respect to a memory device in a memory system in accordance with an embodiment of the present invention. In the embodiment of the present disclosure, for the sake of convenience in explanation, detailed descriptions will be made, as an example, for data processing in the case of performing a command operation corresponding to a command received from the host 102 in the memory system 110 shown in FIG. 1. For example, the data processing in the case of performing a program operation corresponding to a write command received from the host 102 or performing a read operation corresponding to a read command received from the host 102 will be described.

Hereinbelow, a data processing operation which includes a program operation is described as an example of an embodiment of the present invention. Accordingly, after storing write data corresponding to a write command received from the host 102 in a buffer/cache included in the memory 144 of the controller 130, the data stored in the buffer/cache are written and stored in a plurality of pages included in a plurality of memory blocks of the memory device 150. The operation may further include generating and updating map data following the program operation, and then storing the updated map data in the same plurality of memory blocks of the memory device 150 where the data segments are stored. Alternatively, the update map data may be stored in a memory block other than the plurality of memory blocks in which the data segments of the user data are stored.

In an embodiment, as described below the controller 130 may perform a data processing operation in the memory system 110. For example, the processor 134 which is included in the controller 130 may perform the data processing operation the through a flash translation layer (FTL). The data processing operation may, for example, be a program operation wherein after storing user data and metadata corresponding to a write command received from the host 102, in the buffer included in the memory 144 of the controller 130, the controller 130 may write and store the data stored in the buffer, in a plurality of memory blocks, e.g., a first and a second memory block among the plurality of memory blocks included in the memory device 150.

The metadata may include first map data and second map data, for the data stored in the memory blocks in correspondence to the program operation. The first map data may include a logical/physical (logical to physical) (L2P) information (hereinafter, referred to as a 'logical information') and the second map data may include a physical/logical (physical to logical) (P2L) information (hereinafter, referred to as a 'physical information'). Also, the metadata may include an information on the command data corresponding to the command received from the host 102, an information on the command operation corresponding to the command, an information on the memory blocks of the memory device 150 for which the command operation is to be performed, and an information on map data corresponding to the command operation. In other words, the metadata may include all remaining information and map data excluding the user data corresponding to the command received from the host 102.

That is, in the embodiment of the present disclosure, the controller 130 performs a command operation corresponding to a command received from the host 102. For example, the controller 130 performs a program operation corresponding to a write command, in the case where the write command is received from the host 102. At this time, the user data corresponding to the write command are written and stored in a plurality of memory blocks, e.g., first and second memory blocks of the memory device 150. The first and second memory blocks may not be closed memory blocks, i.e., may not be memory blocks not having any available unwritten memory pages. For example, the user data corresponding to the write command may be written and stored in either empty memory blocks (i.e., memory blocks having all of their pages empty without any data stored therein), open memory blocks (i.e., memory blocks having some pages thereof written with data but also having at least one page empty without any data and available), or free memory blocks (i.e., memory blocks for which an erase operation is performed and have therefore all of their non-defective memory pages empty and available), among the memory blocks of the memory device 150. Further, metadata may be written and stored in empty memory blocks, open memory blocks or free memory blocks among the memory blocks of the memory device 150. Metadata may include mapping information between logical addresses and physical addresses for the user data stored in the memory blocks, as first map data, and mapping information between physical addresses and logical addresses for the memory blocks in which the user data are stored, as second map data. The first map data may include an L2P map table or an L2P map list in which logical informations are recorded. The second map data may include a P2L map table or a P2L map list in which physical informations are recorded.

In particular, when a write command is received from the host 102, the controller 130 may write and store user data corresponding to the write command, in a plurality of memory blocks, and may store metadata for the user data including first map data and second map data for the user data, in the memory blocks. The controller 130 may store data segments of the user data and meta segments of the metadata in the memory 144 included in the controller 130. That is, the controller 130 stores the data segments of the user data and the L2P segments of the first map data and the P2L segments of the second map data as the map segments of map data, in the memory 144 included in the controller 130. After the controller 130 stores the data segments of the user data and the meta segments of the metadata in the memory 144 included in the controller 130, the controller 130 stores the data segments of the user data and the meta segments of the metadata in the memory blocks of the memory device 150. In particular, as the data segments of the user data are stored in the memory blocks of the memory device 150, the controller 130 generates, updates and stores meta segments. That is, the controller 130 may perform a map flush operation. Hereinbelow, a data processing operation in the memory system in accordance with the embodiment will be described in detail with reference to FIGS. 5 to 9.

Figure 5:
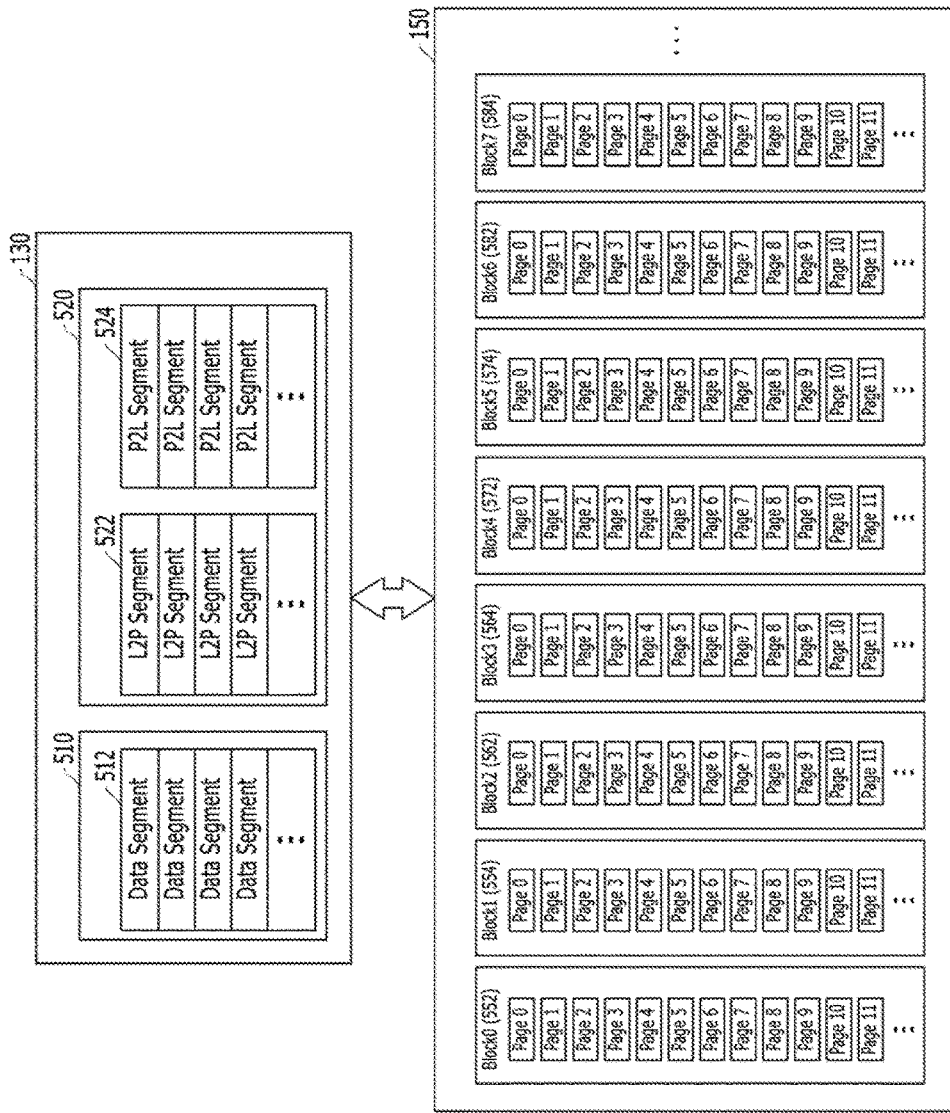
FIGS. 5 to 9 are diagrams illustrating a data processing operation with respect to a memory device in a memory system, in accordance with an embodiment of the present invention.

Referring to FIG. 5, the controller 130 performs a command operation corresponding to a command received from the host 102. For example, the controller 130 performs a program operation corresponding to a write command received from the host 102. At this time, the controller 130 may, for example, write and store user data corresponding to the write command, in a plurality of pages included in a plurality of memory blocks 552, 554, 562, 564, 572, 574, 582 and 584 of the memory device 150. Also, in correspondence to the write operation to the memory blocks 552, 554, 562, 564, 572, 574, 582 and 584, the controller 130 generates and updates metadata for the user data and writes and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150. For example, the controller 130 generates and updates first map data and second map data. That is, the controller 130 generates and updates the logical segments (that is, L2P segments) of the first map data and the physical segments (that is, P2L segments) of the second map data. Then, the controller 130 stores the L2P segments and the P2L segments in the pages included the memory blocks 552, 554, 562, 564, 572, 574, 582 and 584 of the memory device 150, by performing a map flush operation.

For example, the controller 130 caches and buffers the user data corresponding to the write command received from the host 102, in a first buffer 510 included in the memory 144 of the controller 130. That is, the controller 130 stores data segments 512 of the user data in the first buffer 510 as a data buffer/cache. Then, the controller 130 writes and stores the data segments 512 stored in the first buffer 510, in the pages included in the memory blocks 552, 554, 562, 564, 572, 574, 582 and 584 of the memory device 150.

As the data segments 512 of the user data corresponding to the write command received from the host 102 are written and stored in the pages included in the memory blocks 552, 554, 562, 564, 572, 574, 582 and 584 of the memory device 150, the controller 130 generates and updates the first map data and the second map data. Then, the controller 130 stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data. Alternatively, in the second buffer 520, there may be stored a map list for the L2P segments 522 of the first map data and a map list for the P2L segments 524 of the second map data The controller 130 writes and stores the L2P segments 522 of the first map data and the P2L segments 524 of the second map data which are stored in the second buffer 520, in the pages included in the memory blocks 552, 554, 562, 564, 572, 574, 582 and 584 of the memory device 150.

In the embodiment of the present disclosure, in the case where the command operation in the memory blocks 552, 554, 562, 564, 572, 574, 582 and 584 of the memory device 150 is performed for the user data corresponding to the command received from the host 102, the first map data and the second map data for the user data stored in the memory blocks 552, 554, 562 564 572 574, 582 and 584 of the memory device 150 are searched and checked. In other words, by searching and checking the respective logical segments (for example, the L2P segments) of the first map data for the user data and the respective physical segments (for example, the P2L segments) of the second map data for the user data, the command operation in the memory blocks 552, 554, 562, 564, 572, 574, 582 and 584 of the memory device 150 is performed for the user data.

For example, in the embodiment of the present disclosure, in the case where a map update operation or a background operation in correspondence to performing of a read operation corresponding to a read command received from the host 102 or performing of a program operation corresponding to a write command received from the host 102, first map data and second map data for the user data stored in the memory blocks 552, 554, 562, 564, 572, 574, 582 and 584 of the memory device 150 are searched and checked. That is, a scanning operation is performed. The background operation may include a garbage collection operation or a wear leveling operation. The garbage collection operation includes an operation of copying the data stored in the memory blocks 552, 554, 562, 564, 572, 574, 582 and 584 of the memory device 150 to optional memory blocks. The wear leveling operation includes an operation of swapping the memory blocks 552, 554, 562, 564, 572, 574, 582 and 584 of the memory device 150 or the data stored in the memory blocks 552, 554, 562, 564, 572, 574, 582 and 584.

In this regard, in the embodiment of the present disclosure, in order to quickly and stably perform searching and checking for the logical segments of the first map data for the user data and the physical segments of the second map data for the user data, the map segments (that is, the logical segments and the physical segments) included in the first map data and the second map data are sorted according to the logical information (for example, logical page numbers (LPNs)) (hereinafter, referred to as "LPNs") or logical addresses of the user data. In this way, the first map data and the second map data are generated and are then stored in the memory blocks of the memory device 150. Then, in the embodiment of the present disclosure, in the case where the first map data and the second map data are searched and checked to perform the command operation corresponding to the command received from the host 102, after loading the first map data and the second map data in the map cache or map buffer included in the memory 144 of the controller 130, a scanning operation for the sorted map segments of the first map data and the second map data is quickly performed. That is, searching and checking for the logical segments and the physical segments is quickly performed.

In the case of performing the program operation corresponding to the write command received from the host 102, the controller 130 generates and updates map data for the user data corresponding to the write command are stored in the memory blocks 552, 554, 562, 564, 572, 574, 582 and 584 of the memory device 150. For example, the controller 130 generates and updates the second map data. At this time, after checking the logical information (in particular, the LPNs) of the data stored in the pages of the memory blocks 552, 554, 562, 564, 572, 574, 582 and 584, the controller 130 sorts P2L segments included in the P2L map table of the second buffer 524, based on the LPNs, to construct a P2L map table. That is, the controller 130 generates second map data. Then, the controller 130 stores the second map data in which the P2L segments are sorted based on the LPNs, in the memory blocks 552, 554, 562, 564, 572, 574, 582 and 584 of the memory device 150, Also, the controller 130 manages and stores the second map data in the second buffer 524 as the map cache or map buffer included in the memory 144 of the controller 130. In the case of performing update for the first map data and the second map data (in particular, update for the second map data), as user data corresponding to a write command received from the host 102 are stored in the memory blocks 552, 554, 562, 564, 572, 574, 582 and 584 of the memory device 150, after checking the LPNs of the user data stored in the memory blocks 552, 554, 562, 574, 582 and 584, the controller 130 generates second map data by sorting the second map data based on the LPNs. At this time, after loading the second map data stored in the memory blocks 552, 554, 562, 564, 572 574, 582 and 584 of the memory device 150, in the memory 144 of the controller 130, by merging the generated second map data and the loaded second map data, the second map data are updated. The updated second map data are also sorted based on LPNs. The controller 130 stores the updated second map data in the memory blocks 552, 554, 562, 564, 572, 574, 582 and 584 of the memory device 150, and manages and stores the updated second map data in the map cache or map buffer included in the memory 144 of the controller 130.

Therefore in the embodiment of the present disclosure in the case of performing searching and checking among the logical segments and the physical segments of the first map data and the second map data to perform the command operation corresponding to the command received from the host 102, since the logical segments and the physical segments of the first map data and the second map data are sorted based on LPNs, the searching and checking among the logical segments and the physical segments of the first map data and the second map data, for the user data corresponding to the command, may be quickly performed. That is to say, a scanning operation among the first map data and the second map data for the user data corresponding to the command may be quickly performed. Hereinbelow, detailed descriptions will be made, through an example, with reference to FIGS. 6 to 9, for a program operation in the memory system in accordance with the embodiment of the present disclosure. In particular, detailed descriptions will be made, for operations of storing user data corresponding to a write command, in the memory blocks 552, 554, 562, 564, 572, 574, 582 and 584 of the memory device 150, and generating and updating map data (for example, second map data) for the user data corresponding to the write command are stored in the memory blocks 552, 554, 562, 564, 572, 574, 582 and 584 of the memory device 150.

Although descriptions will be made in the embodiment of the present disclosure by taking as an example, for the sake of convenience in explanation, the operation of generating and updating the second map data for the user data corresponding to the write command are stored in the memory blocks 552, 554, 562, 564, 572, 574, 582 and 584 of the memory device 150, it is to be noted that the embodiment may be applied to even an operation of generating and updating the first map data. Also, although descriptions will be made in the embodiment of the present disclosure by taking an example, for the sake of convenience in explanation, that the user data corresponding to the write command and the second map data are stored in different memory blocks among the memory blocks 552, 554, 562, 564, 572 574, 582 and 584 of the memory device 150, it is to be noted that the embodiment may be applied to even the case where the user data and the second map data corresponding to the user data are stored in the same memory block. In particular, in the embodiment of the present disclosure, for the sake of convenience in explanation, detailed descriptions will be made by taking an example that the data segments of the user data corresponding to the write command are stored in the memory block 0 552, the memory block 1 554, the memory block 2 562 and the memory block 3 554 of the memory device 150 and the physical segments (that is the P2L segments) of the second map data are stored in the memory block 4 572 of the memory device 150.

Figure 6:
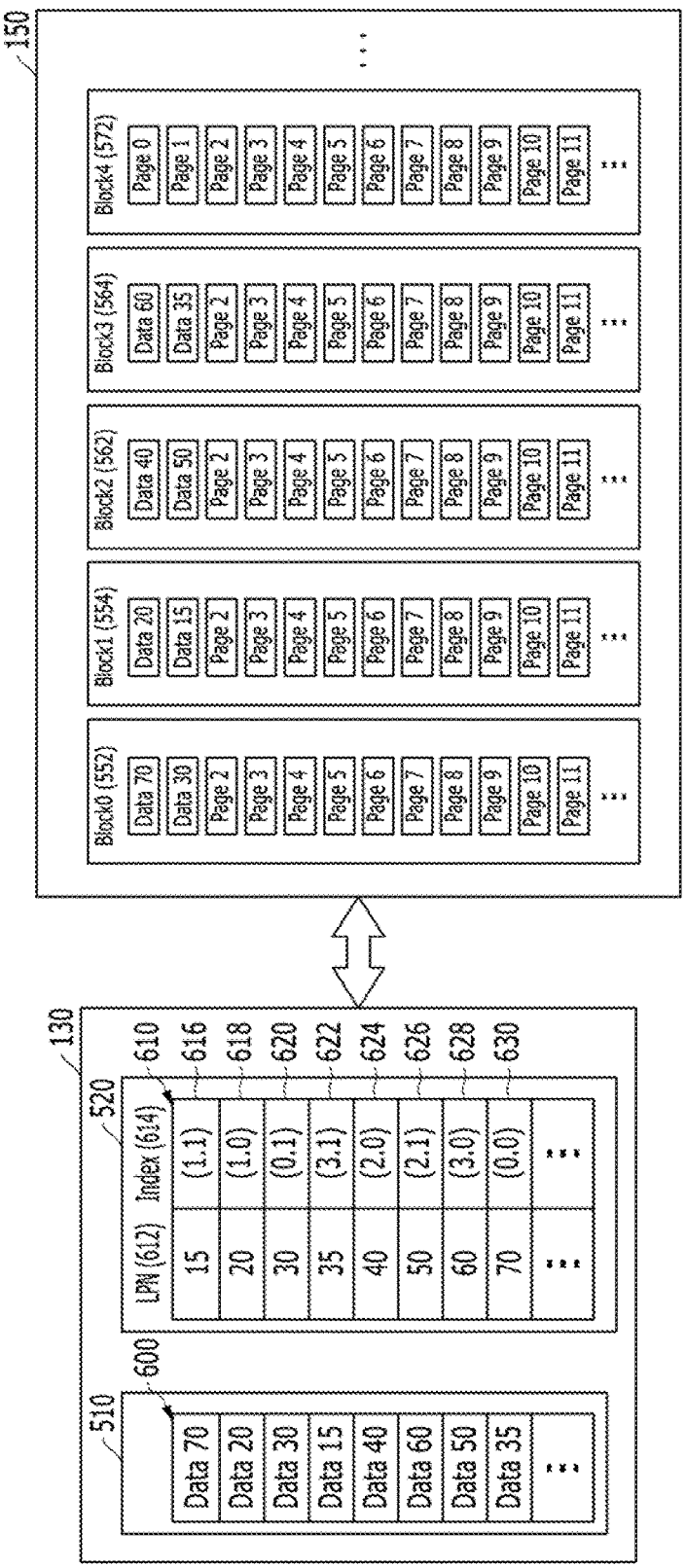

Referring to FIG. 6, when a write command is received from the host 102, the controller 130 stores data segments 600 of user data corresponding to the write command, in the first buffer 510 included in the memory 144 of the controller 130. The controller 130 stores, in the first buffer 510, the data segments 600 of the user data. For example, the controller 130 stores, in the first buffer 510, a data segment having a logical page number of 70 (hereinafter, referred to as "data 70"), a data segment having a logical page number of 20 (hereinafter, referred to as "data 20"), a data segment having a logical page number of 30 (hereinafter, referred to as "data 30"), a data segment having a logical page number of 15 (hereinafter, referred to as "data 15"), a data segment having a logical page number of 40 (hereinafter, referred to as "data 40"), a data segment having a logical page number of 60 (hereinafter, referred to as "data 60"), a data segment having a logical page number of 50 (hereinafter, referred to as "data 50") and a data segment having a logical page number of 35 (hereinafter, referred to as "data 35"), The controller 130 writes and stores the data segments 600 of the user data stored in the first buffer 510, in the pages included in the memory block 0 552, the memory block 1 554, the memory block 2 562 and the memory block 3 564 of the memory device 150. Among the data segments 600 of the user data stored in the first buffer 510, the controller 130 stores the data 70 in a page 0 of the memory block 0 552, stores the data 20 in a page 0 of the memory block 1 554, stores the data 30 in a page 1 of the memory block 0 552, stores the data 15 in a page 1 of the memory block 1 554, stores the data 40 in a page 0 of the memory block 2 562, stores the data 60 in a page 0 of the memory block 3 564, stores the data 50 in a page 1 of the memory block 2 562, and stores the data 35 in a page 1 of the memory block 3 564.

The controller 130 generates information indicating that the data segments 600 of the user data are written and stored in the pages included in the memory block 0 552, the memory block 1 554, the memory block 2 562 and the memory block 3 564 of the memory device 150, by sorting them based on the LPNs of the data segments 600. That is, the controller 130 generates P2L segments 610 of second map data, and stores the P2L segments 610 of the second map data in the second buffer 520.

In detail, in the P2L map table of the second map data in which indexes 614 indicating physical addresses for LPNs 612 of the respective data segments 600 are recorded, the controller 130 generates a P2L segment 630 (hereinafter, referred to as a "P2L segment 70") indicating that the data 70 is stored in the page 0 of the memory block 0 552 a P2L segment 618 (hereinafter, referred to as a "P2L segment 20") indicating that the data 20 is stored in the page 0 of the memory block 1 554, a P2L segment 620 (hereinafter referred to as a "P2L segment 30") indicating that the data 30 is stored in the page 1 of the memory block 0 552, a P2L segment 616 (hereinafter, referred to as a "P2L segment 15") indicating that the data 15 is stored in the page 1 of the memory block 1 554, a P2L segment 624 (hereinafter, referred to as a "P2L segment 40") indicating that the data 40 is stored in the page 0 of the memory block 2 562, a P2L segment 628 (hereinafter, referred to as a "P2L segment 60") indicating that the data 60 is stored in the page 0 of the memory block 3 564, a P2L segment 626 (hereinafter, referred to as a "P2L segment 50") indicating that the data 50 is stored in the page 1 of the memory block 2 562, and a P2L segment 622 (hereinafter, referred to as a "P2L segment 35") indicating that the data 35 is stored in the page 1 of the memory block 3 564.

In other words, the controller 130 generates the P2L segments 610 of the second map data indicating that the data segments 600 of the user data are written and stored in the pages included in the memory block 0 552, the memory block 1 554, the memory block 2 562 and the memory block 3 564 of the memory device 150. For example, the controller 130 generates the P2L segment 70 630, the P2L segment 20 618, the P2L segment 30 620, the P2L segment 15 616, the P2L segment 40 624, the P2L segment 60 628, the P2L segment 50 626 and the P2L segment 35 622. In the respective P2L segments 616, 618, 620, 622, 624, 626, 628 and 630, the LPNs 612 as the logical information of the respective data segments 600 stored in the respective memory blocks 552, 554, 562 and 564 of the memory device 150 are recorded, and the indexes 614 as positions in the respective memory blocks 552, 554, 562 and 564 of the memory device 150 at which the respective data segments 600 are actually stored are recorded.

The controller 130 sorts the P2L segments 610 based on the LPNs 612 of the data segments 600, and thereby, generates the second map data. In other words, the controller 130 sorts the P2L segment 70 630, the P2L segment 20 618, the P2L segment 30 620, the P2L segment 15 616, the P2L segment 40 624, the P2L segment 60 628, the P2L segment 50 626 and the P2L segment 35 622, according to order of LPN 612, in the P2L map table, and thereby, generates the second map data.

The controller 130 stores and manages the second map data generated in this way through sorting based on the LPNs 612, for the respective memory blocks 552, 554, 562 and 564 of the memory device 150. Accordingly, the controller 130 divides the second map data in which the P2L segments 610 are sorted based on the LPNs 612, for the respective memory blocks 552, 554, 562 and 564.

Figure 7:
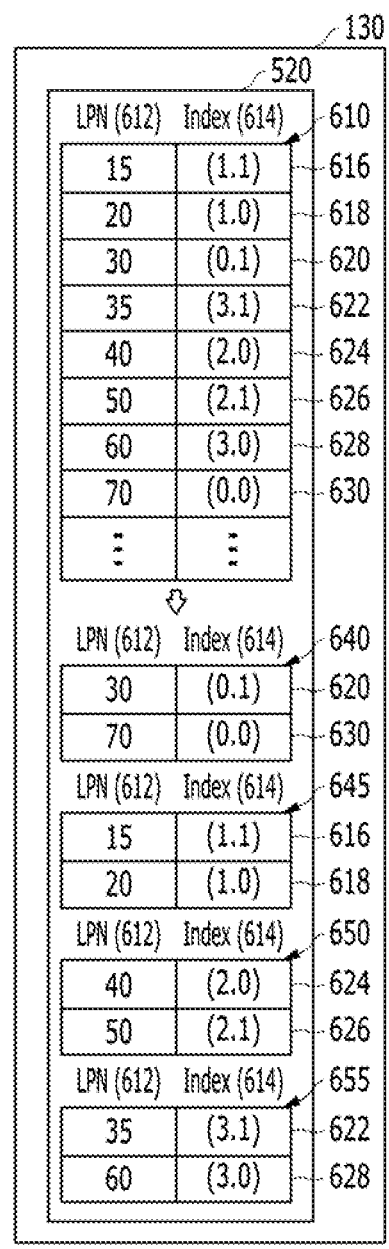

Referring to FIG. 7, the controller 130 generates the second map data including the P2L segments 610 sorted based on the LPNs 612 in correspondence to that the data segments 600 are stored in the pages included in the respective memory blocks 552, 554, 562 and 564 of the memory device 150, as described above. The controller 130 divides the P2L segments 610 of the second map data generated in this way, for the respective memory blocks 552, 554, 562 and 564, and thereby, generates second map data corresponding to the respective memory blocks 552, 554, 562 and 564.

Namely, the controller 130 divides the P2L segments 610 sorted based on the LPNs 612, for the respective memory blocks 552, 554, 562 and 564, and generates second map data 640 (hereinafter, referred to as "second map data 0

640") corresponding to the memory block 0 552, second map data 645 (hereinafter referred to as "second map data 1 645") corresponding to the memory block 1 554, second map data 650 (hereinafter, referred to as "second map data 2 650$^1$") corresponding to the memory block 2 562, and second map data 655 (hereinafter, referred to as second map data 3 655") corresponding to the memory block 3 564. At this time, the second map data 640, 645, 650 and 655 divided by the respective memory blocks 552, 554, 562 and 564 may retain a state in which they are sorted based on the LPNs 612, as the P2L segments 610 sorted based on the LPNs 612 are divided by the respective memory blocks 552, 554, 562 and 564 as described above. That is to say, the P2L segments 620 and 630 of the second map data 0 640 corresponding to the memory block 0 552, the P2L segments 616 and 618 of the second map data 1 645 corresponding to the memory block 1 554, the P2L segments 624 and 626 of the second map data 2 650 corresponding to the memory block 2 562 and the Pa, segments 622 and 628 of the second map data 3 655 corresponding to the memory block 3 564 are respectively sorted based on the LPNs 612.

The controller 130 writes and stores the second map data 640, 645, 650 and 655 for the respective memory blocks 552, 554, 562 and 564, in the pages included in the memory blocks 552, 554, 562, 564 and 572 of the memory device 150. The controller 130 stores the second map data 640, 645, 650 and 655 for the respective memory blocks 552, 554, 562 and 564, in a memory block (e.g., the memory block 4 572) in which data segments are not stored, among the memory blocks 552, 554, 562, 564 and 572 of the memory device 150, as described above. That is, the controller 130 stores the second map data 640, 645, 650 and 655 in not a data memory block but a map memory block (e.g., the memory block 4 572) among the memory blocks 552, 554, 562, 564 and 572, or in corresponding memory blocks 552, 554, 562 and 564.

For instance, the controller 130 stores, among the second map data 640, 645, 650 and 655 for the respective memory blocks 552, 554, 562 and 564, the second map data 0 640, in the pages of the memory block 0 552. For example, the controller 130 stores the second map data 0 640 in pages (e.g., a page 2 and a page 3) next to the pages of the memory block 0 552 in which the data segments (that is, the data 70 and the data 30) are stored.

The controller 130 stores, among the second map data 640, 645, 650 and 655 for the respective memory blocks 552, 554, 562 and 564, the second map data 1 645, in the pages of the memory block 1 554 (for example, pages (i.e., a page 2 and a page 3) next to the pages of the memory block 1 554 in which the data segments (that is, the data 20 and the data 15) are stored. The controller 130 stores, among the second map data 640, 645, 650 and 655 for the respective memory blocks 552, 554, 562 and 564, the second map data 2 650, in the pages of the memory block 2 562. For example, the controller 130 stores the second map data 2 650 in pages (i.e., a page 2 and a page 3) next to the pages of the memory block 2 562 in which the data segments (that is, the data 40 and the data 50) are stored. The controller 130 stores, among the second map data 640, 645, 650 and 655 for the respective memory blocks 552, 554, 562 and 564, the second map data 3 655, in the pages of the memory block 3 564. For example, the controller 130 stores the second map data 3 655 in pages (i.e., a page 2 and a page 3) next to the pages of the memory block 3 564 in which the data segments (that is, the data 60 and the data 35) are stored. In a variation of the present embodiment, the second map data 640, 645, 650 and 655 for the respective memory blocks 552, 554, 562 and 564 may be written and stored in a map memory block that is, the second map data 640, 645, 650 and 655 may be written and stored in the pages included in the memory block 4 572.

Hereinbelow, detailed descriptions will be made with reference to FIGS. 8 and 9, through an example, for an operation of updating map data (for example, second map data), as the data segments of user data corresponding to a write command received from the host 102 are written and stored in the memory blocks 552, 554, 562 and 564 of the memory device 150.

Figure 8:
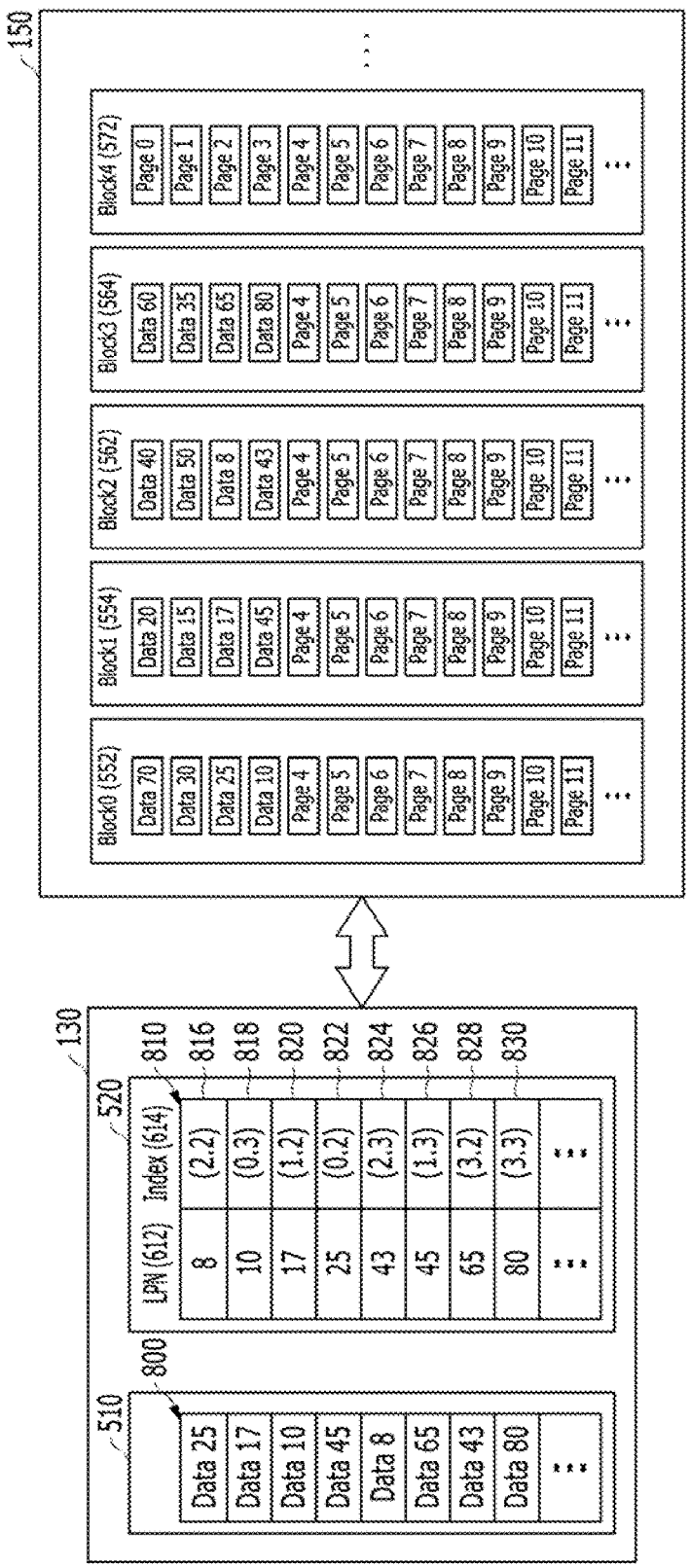
Figure 9:
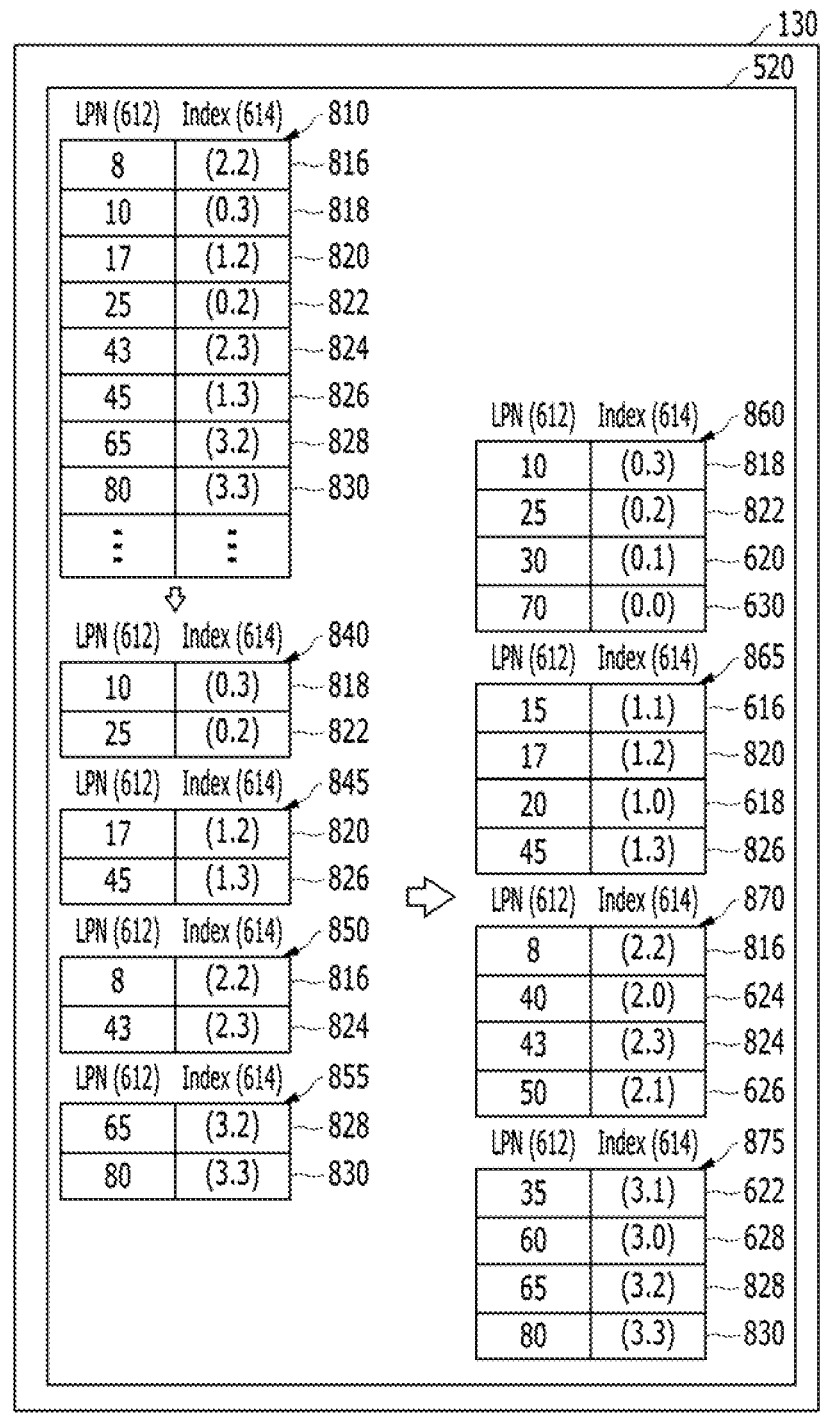

Referring to FIG. 8, when a write command is received from the host 102, the controller 130 stores data segments 800 of user data corresponding to the write command, in the first buffer 510 included in the memory 144 of the controller 130. The controller 130 stores, in the first buffer 510, the data segments 800 of the user data. For example, the controller 130 stores, in the first buffer 510, a data segment having a logical page number of 25 (hereinafter, referred to as "data 25"), a data segment having a logical page number of 17 (hereinafter, referred to as "data 17"), a data segment having a logical page number of 10 (hereinafter, referred to as "data 10"), a data segment having a logical page number of 45 (hereinafter, referred to as "data 45"), a data segment having a logical page number of 8 (hereinafter, referred to as "data 8"), a data segment having a logical page number of 65 (hereinafter, referred to as "data 65"), a data segment having a logical page number of 43 (hereinafter, referred to as "data 43") and a data segment having a logical page number of 80 (hereinafter, referred to as "data 80").

The controller 130 writes and stores the data segments 800 of the user data stored in the first buffer 510, in the pages included in the memory block 0 552, the memory block 1 554, the memory block 2 562 and the memory block 3 564 of the memory device 150. Among the data segments 800 of the user data stored in the first buffer 510, the controller 130 stores the data 25 in a page 2 of the memory block 0 552, stores the data 17 in a page 2 of the memory block 1 554, stores the data 10 in a page 3 of the memory block 0 552, stores the data 45 in a page 3 of the memory block 1 554, stores the data 8 in a page 2 of the memory block 2 562, stores the data 65 in a page 2 of the memory block 3 564, stores the data 43 in a page 3 of the memory block 2 562, and stores the data 80 in a page 3 of the memory block 3 564.

The controller 130 generates information indicating that the data segments 800 of the user data are written and stored in the pages included in the memory block 0 552, the memory block 1 554, the memory block 2 562 and the memory block 3 564 of the memory device 150, by sorting them based on the LPNs of the data segments 800. That is, the controller 130 generates P2L segments 810 of second map data, and stores the P2L segments 810 of the second map data in the second buffer 520, by sorting them based on the LPNs of the data segments 800.

In detail, in the P2L map table of the second map data in which indexes 614 indicating physical addresses for LPNs 612 of the respective data segments 800 are recorded, the controller 130 generates a P2L segment 822 (hereinafter, referred to as a "P2L segment 25") indicating that the data 25 is stored in the page 2 of the memory block 0 552, a P2L segment 820 (hereinafter, referred to as a "P2L segment 17") indicating that the data 17 is stored in the page 2 of the memory block 1 554, a P2L segment 818 (hereinafter, referred to as a "P2L segment 10") indicating that the data 10 is stored in the page 3 of the memory block 0 552, a P2L segment 826 (hereinafter, referred to as a "P2L segment 45") indicating that the data 45 is stored in the page 3 of the memory block 1 554, a P2L segment 816 (hereinafter, referred to as a "P2L segment 8") indicating that the data 8 is stored in the page 2 of the memory block 2 562, a P2L segment 828 (hereinafter, referred to as a "P2L segment 65") indicating that the data 65 is stored in the page 2 of the memory block 3 564, a P2L segment 824 (hereinafter, referred to as a "P2L segment 43") indicating that the data 43 is stored in the page 3 of the memory block 2 562, and a P2L segment 830 (hereinafter, referred to as a "P2L segment 80") indicating that the data 80 is stored in the page 3 of the memory block 3 564.

In other words, the controller 130 generates the P2L segments 810 of the second map data indicating that the data segments 800 of the user data are written and stored in the pages included in the memory block 0 552, the memory block 1 554, the memory block 2 562 and the memory block 3 564 of the memory device 150. For example, the controller 130 generates the P2L segment 25 822, the P2L segment 17 820, the P2L segment 10 818, the P2L segment 45 826, the P2L segment 8 816, the P2L segment 65 828, the P2L segment 43 824 and the P2L segment 80 830. In the respective P2L segments 816, 818, 820, 822, 824, 826, 828 and 830, the LPNs 612 as the logical information of the respective data segments 800 stored in the respective memory blocks 552, 554, 562 and 564 of the memory device 150 are recorded, and the indexes 614 as positions in the respective memory blocks 552, 554, 562 and 564 of the memory device 150 at which the respective data segments 800 are actually stored are recorded.

The controller 130 sorts the P2L segments 810 based on the LPNs 612 of the data segments 800, and thereby, generates the second map data. In other words, the controller 130 sorts the P2L segment 25 822, the P2L segment 17 820, the P2L segment 10 818, the P2L segment 45 826, the P2L segment 8 816, the P2L segment 65 828, the P2L segment 43 824 and the P2L segment 80 830, according to order of LPN 612, in the P2L map table, and thereby, generates the second map data.

The controller 130 stores and manages the second map data generated in this way through sorting based on the LPNs 612, for the respective memory blocks 552, 554, 562 and 564 of the memory device 150. Accordingly, the controller 130 divides the second map data in which the P2L segments 810 are sorted based on the LPNs 612, for the respective memory blocks 552, 554, 562 and 564, Referring to FIG. 9, the controller 130 generates the second map data including the P2L segments 810 sorted based on the LPNs 612 in correspondence to that the data segments 800 are stored in the pages included in the respective memory blocks 552, 554, 562 and 564 of the memory device 150, as described above. The controller 130 divides the P2L segments 810 of the second map data generated in this way, by the respective memory blocks 552, 554, 562 and 564, and thereby, generates second map data corresponding to the respective memory blocks 552, 554, 562 and 564.

Namely, the controller 130 divides the P2L segments 810 sorted based on the LPNs 612, by the respective memory blocks 552, 554, 562 and 564, and generates second map data 0 840 corresponding to the memory block 0 552, second map data 1 845 corresponding to the memory block 1 554, second map data 2 850 corresponding to the memory block 2 562 and second map data 3 855 corresponding to the memory block 3 564. At this time, the second map data 840, 845, 850 and 855 divided by the respective memory blocks 552, 554, 562 and 564 may retain a state in which they are sorted based on the LPNs 612, as the P2L segments 810 sorted based on the LPNs 612 are divided by the respective memory blocks 552, 554, 562 and 564 as described above. That is to say, the P2L segments 818 and 822 of the second map data 0 840 corresponding to the memory block 0 552, the P2L segments 820 and 826 of the second map data 1 845 corresponding to the memory block 1 554, the P2L segments 816 and 824 of the second map data 2 850 corresponding to the memory block 2 562 and the Pa, segments 828 and 830 of the second map data 3 855 corresponding to the memory block 3 564 are respectively sorted based on the LPNs 612.

The controller 130 writes and stores the second map data 840, 845, 850 and 855 for the respective memory blocks 552, 554, 562 and 564, in the pages included in the memory blocks 552, 554, 562, 564 and 572 of the memory device 150. At this time, the controller 130 updates the current second map data 840, 845, 850 and 855 for the respective memory blocks 552, 554, 562 and 564, by merging the previous second map data 640, 645, 650 and 655 for the respective memory blocks 552, 554, 562 and 564 and the current second map data 840, 845, 850 and 855 for the respective memory blocks 552, 554, 562 and 564.

In detail, the controller 130 loads the previous second map data 640, 645, 650 and 655 for the respective memory blocks 552, 554, 562 and 564, in the second buffer 520 from the pages included in the memory block 4 572, merges the loaded previous second map data 640, 645, 650 and 655 for the respective memory blocks 552, 554, 562 and 564 and the current second map data 840, 845, 850 and 855 for the respective memory blocks 552, 554, 562 and 564 generated as described above. Accordingly, the controller 130 generates updated second map data 860, 865, 870 and 875 for the respective memory blocks 552, 554, 562 and 564. For example, the controller 130 generates the updated second map data 0 860 sorted based on the LPNs 612, by merging the previous second map data 0 640 and the current second map data 0 840 respectively sorted based on the LPNs 612, generates the updated second map data 1 865 sorted based on the LPNs 612, by merging the previous second map data 1 645 and the current second map data 1 845 respectively sorted based on the LPNs 612, generates the updated second map data 2 870 sorted based on the LPNs 612, by merging the previous second map data 2 650 and the current second map data 2 850 respectively sorted based on the LPNs 612, and generates the updated second map data 3 875 sorted based on the LPNs 612, by merging the previous second map data 3 655 and the current second map data 3 855 respectively sorted based on the LPNs 612.

At this time, the updated second map data 860, 865, 870 and 875 divided by the respective memory blocks 552, 554, 562 and 564 may retain a state in which they are sorted based on the LPNs 612, as the previous second map data 640, 645, 650 and 655 and the current second map data 840, 845, 850 and 855 respectively sorted based on the LPNs 612 are merged and updated as described above. That is to say, the P2L segments 818, 822, 620 and 630 of the updated second map data 0 860 corresponding to the memory block 0 552, the P2L segments 616, 820 618 and 826 of the updated second map data 1 865 corresponding to the memory block 1 554, the P2L segments 816, 624, 824 and 626 of the updated second map data 2 870 corresponding to the memory block 2 562 and the P2L segments 622, 628, 828 and 830 of the updated second map data 3 875 corresponding to the memory block 3 564 are respectively sorted based on the LPNs 612.

The controller 130 writes and stores the updated second map data 860, 865, 870 and 875 for the respective memory blocks 552 554, 562 and 564, in the pages included in the memory blocks 552, 554, 562, 564 and 572 of the memory device 150, in the same manner as described above. The controller 130 stores the updated second map data 860, 865, 870 and 875 for the respective memory blocks 552, 554, 562 and 564, in a memory block (e.g., the memory block 4 572) in which data segments are not stored, among the memory blocks 552, 554, 562, 564 and 572 of the memory device 150, as described above. That is, the controller 130 stores the second map data 860, 865, 870 and 875 in not a data memory block but a map memory block (e.g., the memory block 4 572) among the memory blocks 552, 554, 562, 564 and 572, or in corresponding memory blocks 552, 554, 562 and 564.

For instance, the controller 130 stores, among the updated second map data 860, 865, 870 and 875 for the respective memory blocks 552, 554, 562 and 564, the updated second map data 0 860, in the pages of the memory block 0 552. For example, the controller 130 stores the second map data 0 860 in pages (e.g., a page 4 and a page 5) next to the pages of the memory block 0 552 in which the data segments (that is, the data 25 and the data 10) are stored. The controller 130 stores, among the updated second map data 860, 865, 870 and 875 for the respective memory blocks 552, 554, 562 and 564, the updated second map data 1 865, in the pages of the memory block 1 554 (for example, pages (i.e., a page 4 and a page 5) next to the pages of the memory block 1 554 in which the data segments (that is, the data 17 and the data 45) are stored. The controller 130 stores, among the updated second map data 860, 865, 870 and 875 for the respective memory blocks 552, 554, 562 and 564, the updated second map data 2 870, in the pages of the memory block 2 562. For example, the controller 130 stores the second map data 2 870 in pages (Le., a page 4 and a page 5) next to the pages of the memory block 2 562 in which the data segments (that is, the data 8 and the data 43) are stored. The controller 130 stores, among the updated second map data 860, 865, 870 and 875 for the respective memory blocks 552, 554, 562 and 564, the updated second map data 3 875, in the pages of the memory block 3 564. For example, the controller 130 stores the second map data 3 875 in pages (i.e., a page 4 and a page 5) next to the pages of the memory block 3 564 in which the data segments (that is, the data 65 and the data 80) are stored. In the embodiment of the present disclosure as described above, the updated second map data 860, 865, 870 and 875 for the respective memory blocks 552, 554, 562 and 564 are stored in a map memory block. That is, the updated second map data 860, 865, 870 and 875 are written and stored in the pages included in the memory block 4 572.

As a consequence, in the memory system in accordance with an embodiment of the present disclosure, in the case of performing a program operation corresponding to a write command received from the host 102, user data corresponding to the write command are stored in the memory blocks of the memory device 150, and map data corresponding to the user data stored in the memory blocks of the memory device 150 are generated and updated. In particular, the map data are generated and updated by sorting the map segments of the map data based on logical information (for instance, LPNs), for the data segments of the user data. Furthermore, in the state in which the map segments of the map data are sorted based on the LPNs, after the map data are divided by the respective memory blocks or are generated and updated by merging map segments, the map data are stored in the memory blocks of the memory device 150. Accordingly, in a memory system in accordance with an embodiment of the present disclosure, when searching and checking map data for the memory device 150, since the map data are stored and managed in the memory blocks of the memory device 150 and sorted based on their LPNs, the searching and checking of the map data for the memory device 150 may be performed more quickly performed, that is, a scanning operation may be quickly performed. Hereinbelow, an operation for processing data in a memory system in accordance with an embodiment will be described in detail with reference to FIG. 10.

Figure 10:
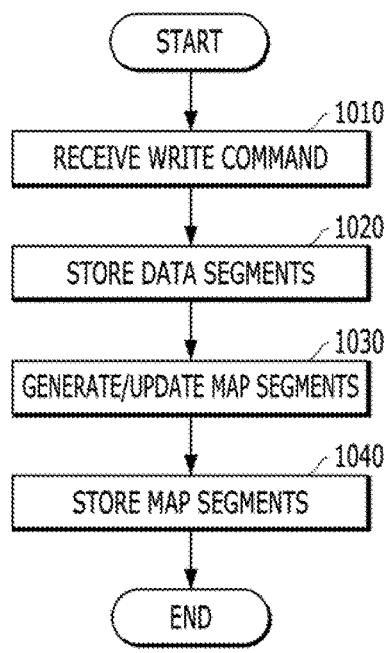
FIG. 10 is a flow chart illustrating an operation process for processing data in a memory system in accordance with an embodiment of the present invention.

FIG. 10 is a flow chart illustrating an operation process for processing data in a memory system, in accordance with an embodiment of the present invention.

Referring to FIG. 10, at step 1010, the memory system receives a write command from the host 102. At step 1020, a program operation corresponding to the write command received from the host 102 is performed. That is, the data segments of user data corresponding to the write command are stored in the pages included in the memory blocks of the memory device 150.

At step 1030, map data corresponding to the data segments of the user data corresponding to the write command which are stored in the pages included in the memory blocks of the memory device 150 are generated and updated. At this time, the map segments of the map data are generated and updated by sorting them based on the logical information (for instance, LPNs) of the data segments.

Then, at step 1040, the generated and updated map segments of the map data are stored in the pages included in the memory blocks of the memory device 150.

Since detailed descriptions were made above with reference to FIGS. 5 to 9 for operations of storing the data segments of user data corresponding to a write command received from the host 102, in the memory blocks of the memory device 150, and, in correspondence to the storage of the data segments of the user data in the memory blocks of the memory device 150, generating and updating the map segments of map data, in particular, generating and updating the map segments of map data in a state in which the map segments of the map data are sorted based on the logical information, (for example, LPNs) of the data segments, further descriptions thereof will be omitted herein.

Hereinbelow, detailed descriptions will be made with reference to FIGS. 11 to 16, of various embodiments of a data processing system and electronic apparatuses which employ a memory system 110 including the memory device 150 and the controller 130 described above with reference to FIGS. 1 to 10.

Figure 11:
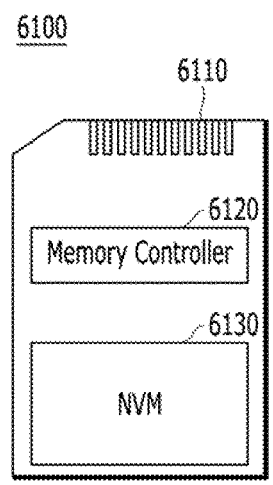
FIGS. 11 to 16 are diagrams illustrating examples of memory systems according to embodiments of the present invention.

FIG. 11 is a diagram illustrating a data processing system including the inventive memory system according to an embodiment. Specifically, FIG. 11 illustrates a memory card system 6100 including a memory controller 6120, a memory device 6130, and a connector 6110.

The memory controller 6120 may be operatively connected with the memory device 6130 and may access the memory device 6130. In some embodiments the memory device 6130 may be implemented with a nonvolatile memory (NVM). For example the memory controller 6120 may control the operations of the memory device 6130 including at least one of a read, write, erase and background operations. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 10 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCI-e), Advanced Technology Attachment (ATA), Serial-ATA, Parallel-ATA, small computer system interface (SCSI), enhanced small disk interface (ESDI), Integrated Drive Electronics (IDE), Firewire, universal flash storage ( UFS), wireless-fidelity (WI-FI) and Bluetooth. Accordingly, the memory system and the data processing system according to the embodiment may be applied to wired/wireless electronic appliances, for example a mobile electronic appliance.

The memory device 6130 may be implemented with a nonvolatile memory (NVM). For example, the memory device 6130 may be implemented with one of various nonvolatile memory devices such as an electrically erasable and programmable ROM (EPROM), a NAND flash memory, a NOR flash memory, a phase-change RAM (PRAM), a resistive RAM (ReRAM) a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (e.g., Personal Computer Memory Card International Association (PCM-CIA)), a compact flash card (CF), a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 12:
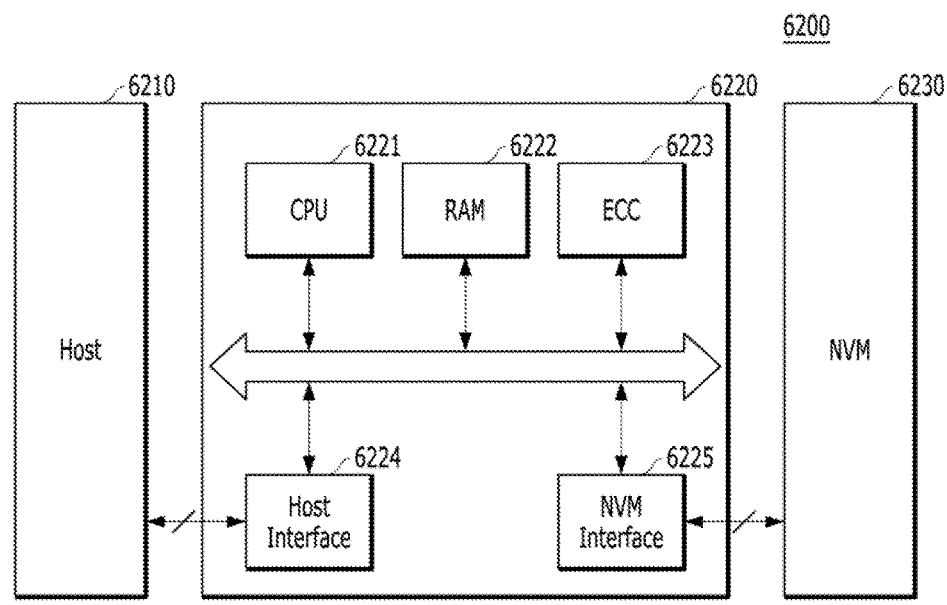

FIG. 12 is a diagram schematically illustrating another example of a data processing system 6200 including a memory system according to an embodiment of the present invention.

Referring to FIG. 12, the data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1, The memory controller 6220 may control the operations, including the read, write and erase operations for the memory device 6230 in response to requests received from a host 6210. The memory controller 6220 may include at least one of a central processing unit (CPU) 6221, a random access memory (RAM) as a buffer memory 6222, an error correction code (ECC) circuit 6223, a host interface 6224, and an. NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using one of various coded modulations such as a low density parity check (LDDC) code, a Bose-Chaudhuri-Hocquenghem (BCH) code a turbo code a Reed-Solomon (RS) code, a convolution code, a recursive systematic code (RSC) a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be operatively connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCI-e) or a NAND interface. Further, as a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, for example, a mobile electronic appliance.

Figure 13:
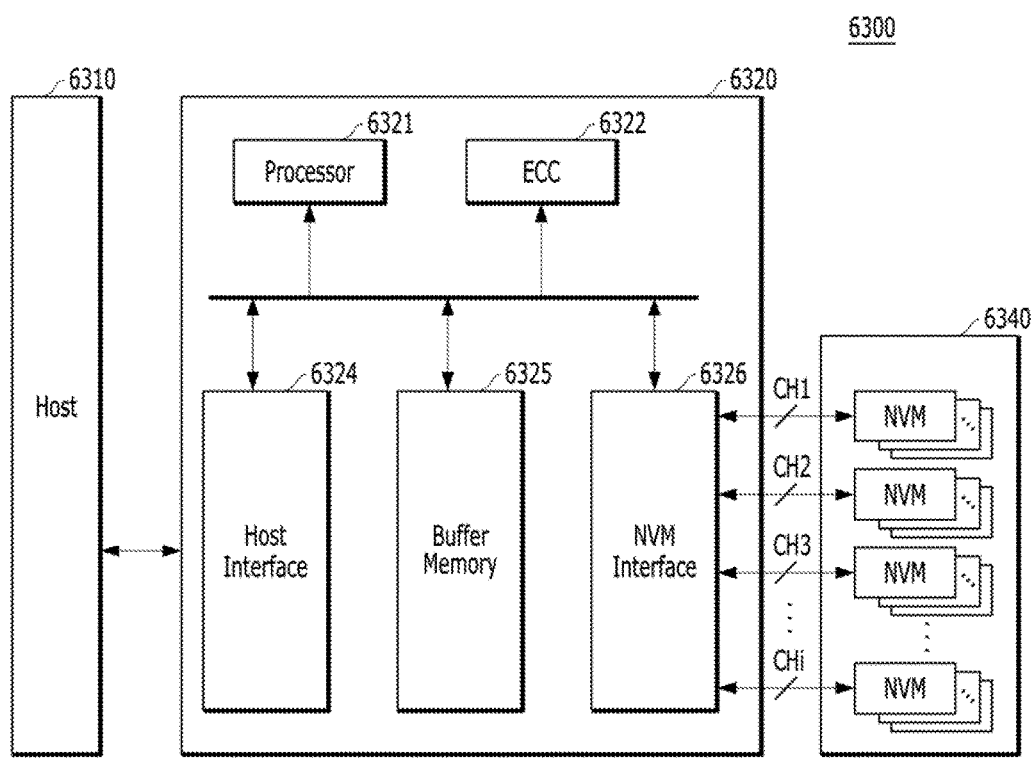

FIG. 13 is a diagram illustrating another example of a data processing system including a memory system according to an embodiment of the invention. For example, in FIG. 13 may be a solid state drive (SSD) 6300 employing a memory system is shown, according to an embodiment of the present invention.

Referring to FIG. 13, the SSD 6300 may include a memory device 6340 which may include a plurality of nonvolatile memories NVM, and a controller 6320. The controller 6320 may correspond to the controller 130 in the memory system 110 described above with reference to FIG.

1, and the memory device 6340 may correspond to the memory device 150 the memory system 110 described above with reference to FIG. 1.

In detail, the controller 6320 may be operatively connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 13, for the sake of convenience in explanation that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1 CH2 CH3, and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 14:
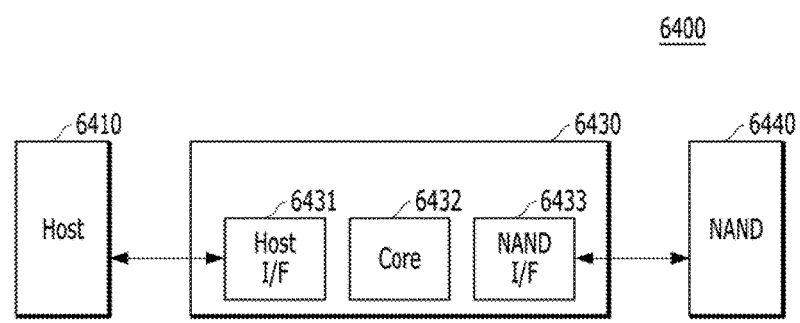

FIG. 14 is a diagram illustrating another example of a data processing system including the memory system according to an embodiment of the present invention. For example, in FIG. 14, an embedded multimedia card (eMMC) 6400 employing a memory system is shown. Referring to FIG. 14, the eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be operatively connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 15:
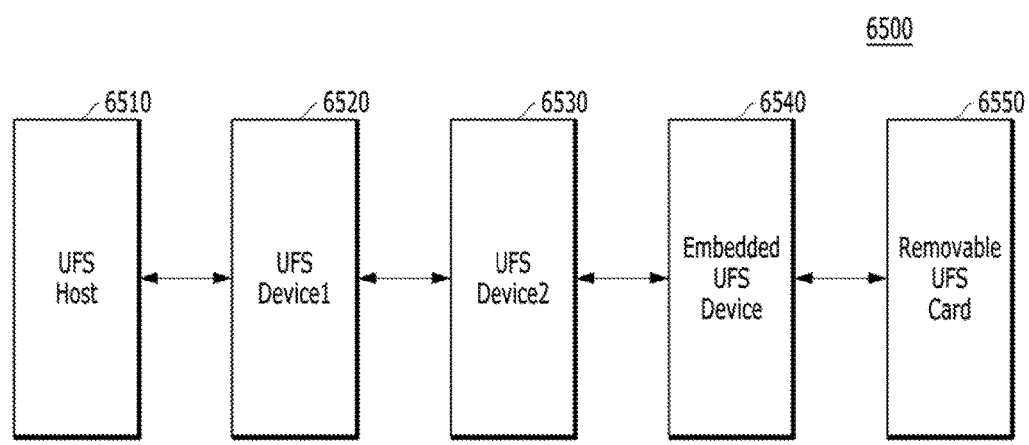

FIG. 15 is a diagram illustrating another example of a data processing system including a memory system according to an embodiment of the present invention. For example, in FIG. 15, a universal flash storage (UFS) 6500 employing the memory system is shown.

Referring to FIG. 15, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 11. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 16:
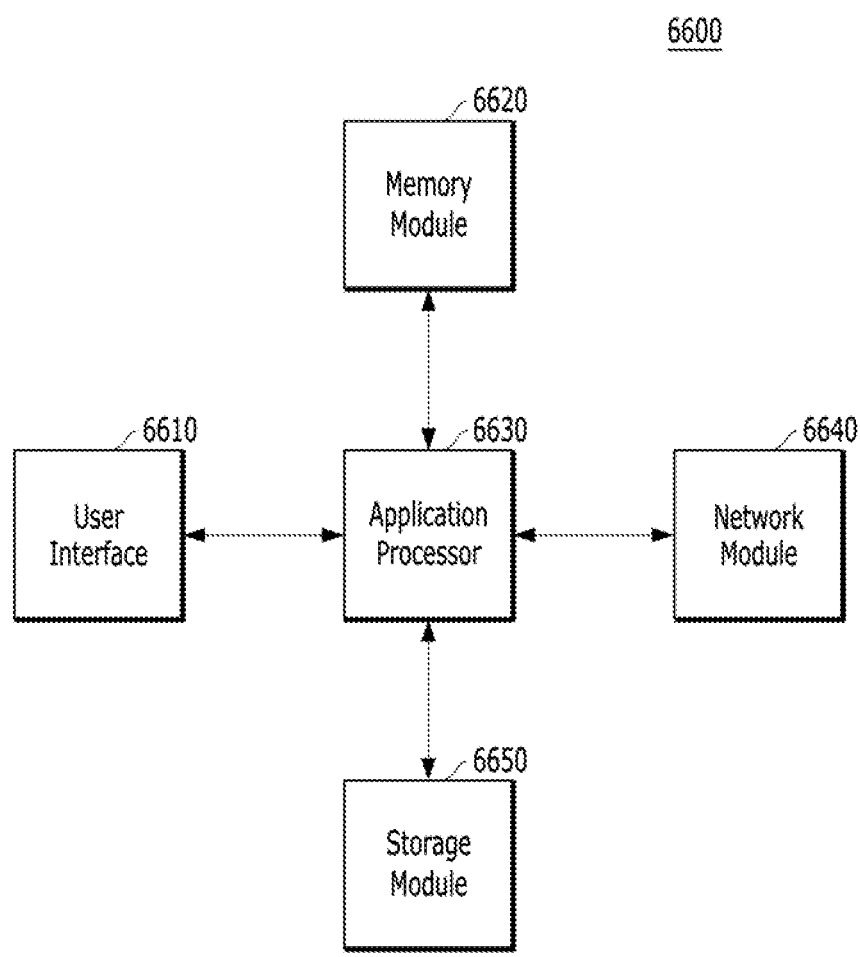

FIG. 16 is a diagram illustrating another example of a data processing system including the memory system according to an embodiment of the present invention. For example, in FIG. 16, a user system 6600 employing the memory system is shown, Referring to FIG. 16, the user system 6600 may include a user interface 6610, a memory module 6620, an application processor 6630, a network module 6640 and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, for example, a mobile electronic appliance. Accordingly, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 13 to 15.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED display device, a light emitting diode (LED) a speaker and a motor.

In the case where the memory system 110 described above with reference to FIG. 1 is applied to a mobile electronic appliance of the user system 6600 according to an embodiment, the application processor 6630 may control the operations of the mobile electronic appliance, and the network module 6640 as a communication module may control wired wireless communication with an external device, as described above. The user interface 6610 as the display/touch module of the mobile electronic appliance displays data processed by the application processor 6630 or supports input of data from a touch panel.

The memory system and the operating method thereof according to the present disclosure may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory blocks, each memory block including a plurality of pages, each page including a plurality of memory cells for storing data; and
a controller suitable for storing data segments of user data, corresponding to a write command, in a plurality of pages included in the plurality of memory blocks, generating a map data corresponding to the stored data segments, dividing the map data into plural groups, each corresponding to each of the plurality of memory blocks, sorting map segments of the divided map data according to a logical address of the data segments, and storing the sorted map data in the memory device,
wherein the controller generates a first map data including a logical to physical (L2P) map segments indicating which logical address of the data segment is matched with a physical address of at least one page in the plurality of memory blocks, and a second map data including a physical to logical (P2L) map segments indicating which physical address is matched with a logical address of the data segment,
wherein the controller further comprises a memory,
wherein the controller stores the first map data and the second map data in the pages included in the plurality of memory blocks, and
wherein, in the case of updating the first map data and the second map data in correspondence to storage of the data segments, the controller loads the first map data and the second map data in the memory.

2. The memory system according to claim 1, wherein the controller stores the first map data in pages included in a first memory block, and stores the second map data in pages included in a second memory block.

3. The memory system according to claim 2,
wherein the controller generates the first map data of the first memory block by sorting first map segments corresponding to the first memory block among the map segments, according to the logical information, and
wherein the controller generates the second map data of the second memory block by sorting second map segments corresponding to the second memory block among the map segments, according to the logical information.

4. The memory system according to claim 1, wherein the controller stores the first map data and the second map data in pages included in a third memory block among the plurality of memory blocks.

5. The memory system according to claim 1, wherein the controller updates the first map data and the second map data by merging map segments of the first map data and the second map data generated in correspondence to storage of the data segments and map segments of first map data and the second map data loaded in the memory.

6. The memory system according to claim 5, wherein the controller updates the first map data and the second map data by merging the map segments of the first map data and the second map data in a state in which they are sorted according to the logical information.

7. The memory system according to claim 1, wherein the controller sorts indexes indicating storage in the pages of the first memory block and the second memory block in the sequence of logical page numbers (LPNs) of the data segments, in a map table of the map data.

8. A method for operating a memory system, comprising:
receiving a write command, for a memory device including a plurality of memory blocks, each including a plurality of pages;
storing data segments of user data, corresponding to the write command, in pages included in the plurality of memory blocks;
generating a map data corresponding to storage of the data segments;
dividing the map data into plural groups, each corresponding to each of the plurality of memory blocks;
sorting map segments of the divided map data according to a logical address of the data segments;
storing the sorted map data in the memory device :
storing the first map data and the second map data in the pages included in the plurality of memory blocks, and
loading, in the case of updating the first map data and the second map data in correspondence to storage of the data segments, the first map data and the second map data in a
memory included in a controller, wherein the generating of the map data comprises:
generating a first map data including a logical to physical (L2P) map segments indicating which logical address of the data segment is matched with a physical address of at least one page in the plurality of memory blocks; and
generating a second map data including a physical to logical (P2L) map segments indicating which physical address is matched with a logical address of the data segment.

9. The method according to claim 8, wherein the storing of the sorted map data comprises:
storing the first map data in pages included in a first memory block, and storing the second map data in pages included in a second memory block.

10. The method according to claim 9, wherein the generating of the map data comprises:
generating the first map data of the first memory block by sorting first map segments corresponding to the first memory block among the map segments, according to the logical information; and
generating the second map data of the second memory block by sorting second map segments corresponding to the second memory block among the map segments, according to the logical information.

11. The method according to claim 8, wherein the storing of the sorted map data comprises:
storing the first map data and the second map data in pages included in a third memory block among the plurality of memory blocks.

12. The method according to claim 8, further comprising:
updating the first map data and the second map data by merging map segments of the first map data and the second map data generated in correspondence to storage of the data segments and map segments of first map data and the second map data loaded in the memory.

13. The method according to claim 12, wherein the updating of the first map data and the second map data comprises updating the first map data and the second map data by merging the map segments of the first map data and the second map data in a state in which they are sorted according to the logical information.

14. The method according to claim 8, wherein the generating of the map data comprises:
sorting indexes indicating storage in the pages of the first memory block and the second memory block in the sequence of logical page numbers (LPNs) of the data segments, in a map table of the map data.

* * * * *